Figure 2:
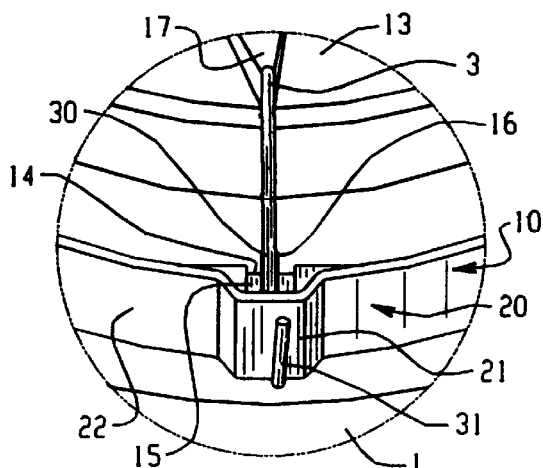

United States Patent [19]

Ocsovai et al.

[11] Patent Number: 6,081,067
[45] Date of Patent: Jun. 27, 2000

[54] PLASTIC HOUSING AND SCREW BASE CONSTRUCTION FOR COMPACT FLUORESCENT LAMPS AND ELECTRICAL OPERATING UNITS THEREOF

[75] Inventors: Ákos Ocsovai; Ferenc Papp; József Fülöp; István Würsching, all of Budapest, Hungary

[73] Assignee: General Electric Company, Schenectady, N.Y.

[21] Appl. No.: 09/121,607

[22] Filed: Jul. 13, 1998

[30] Foreign Application Priority Data

Aug. 1, 1997 [HU] Hungary ................................. 9701339

[51] Int. Cl.[7] ....................................................... H01J 5/48
[52] U.S. Cl. .................. 313/318.01; 313/318.12
[58] Field of Search .......................... 313/318.01, 318.04, 313/318.09, 318.12

[56] References Cited

U.S. PATENT DOCUMENTS 5,032,759  7/1991  Thiry et al. .

Primary Examiner—Vip Patel
Attorney, Agent, or Firm—Fay, Sharpe, Fagan, Minnich & McKee, LLP

[57] ABSTRACT

Plastic housing and screw base construction for compact fluorescent lamps and electrical operating units thereof comprising a base (2) including a metal screw base shell (20) with a thread-free opening portion (22) and a plastic housing (1). The plastic housing (1) has a neck part (10) which is a body of rotation with central axis (O). The neck part comprises a cylindrical or slightly conical mantle portion (12), which starts from a stop shoulder (11), and a shell (13) which connects to the mantle portion (12) and which has an open end and diameters decreasing in at least one step. The base (2) is pushed over and fixed to the neck part (10) of the plastic housing (1). A lead wire (3) is passed through from the inner space of the plastic housing (1) between the thread-free opening portion (22) of the base shell (20) and the mantle portion (12) of the neck part (10). A rib (14), which protrudes in and has a front surface (15) perpendicular to radial direction, is formed on the mantle portion (12). A slot (16), which extends parallel to the central axis (O) and has a depth suitable for accepting a portion (30) of the lead wire (3) leaving the plastic housing (1), is indented into the front surface (15). A local protrusion (21) with an inner size and shape fitting to the rib (14) is made in the thread-free opening portion (22) of the base shell (20). The said portion (30) of the lead wire (3) is bent back towards the end of the base (2) and is fixed to the base shell (20) by resistance welding with a compression force exerted in radial direction from outside.

6 Claims, 1 Drawing Sheet

PLASTIC HOUSING AND SCREW BASE CONSTRUCTION FOR COMPACT FLUORESCENT LAMPS AND ELECTRICAL OPERATING UNITS THEREOF

This invention relates to a plastic housing and screw base construction for compact fluorescent lamps and electrical operating units thereof, and, more particularly, to a structure in which at least one lead wire of the operating unit of the lamp is connected to a screw base with a welded joint.

Lead wires of the operating unit of compact fluorescent lamps are, according to widespread use, soldered to the screw base fixed to the plastic housing of the operating unit comprising an electronic circuit suitable for supplying these lamps. The material used for soldering contains a substantial quantity of lead that amounts to about half the lead content of the electronic circuit built into the product. The considerations of both health and environment protection have brought about the need for reducing the lead content of the product to the greatest possible extent. In the light source industry, the lead-in wires of some light source types are connected to the corresponding metal part of the base by means of a welded joint, which is described e.g. in U.S. Pat. No. 5,032,759 in addition to many published examples of practical use. Based on this, the idea has arisen to fix also the electrical lead wires of compact fluorescent lamps and optionally those of their separately built operating units to the metal parts of generally used screw bases by means of welding instead of the soldered joint used so far in order to reduce the lead content of the light source.

Early experiments quickly showed that implementation of the above idea in practice gives rise to many difficulties. All these difficulties are caused by the plastic parts which have gained widespread use in compact lamps, especially compact fluorescent lamps. This plastic part in this case is the plastic housing of the operating unit of the compact fluorescent lamp which makes it difficult to weld together the metal parts combined with it owing to its sensitivity to heat. It became evident that many known welding methods used at least partly also in the manufacturing processes of conventional light sources, particularly arc, plasma and laser welding are not suitable for welding together metal parts that are combined with plastic parts because of the substantial amount of heat released during the welding process. Preventive measures could be taken to protect the plastic parts but these would be too expensive to justify the investment. Since it is necessary to use a welding method the heat effect of which does not cause damage to the plastic parts in the vicinity of welding, resistance welding has become more and more important as a possible welding method to be used on the plastic housing with standard screw base containing metal parts.

However, significant difficulties and uncertainties appeared particularly in the resistance welding of the so-called side lead wires going and welded to the Edison-screw bases with screw shell portion. It became evident that operation errors occur frequently in the case of the constructions consisting of a plastic housing and a base, due to the bow of the base shell causing wrong positioning of the lead wire end to be welded. Because of the wrong positioning, it often occurs that a direct contact is made between the welding electrode and the base shell without inserting the end of the lead wire. This has the consequence that the wire end will not be welded to the base shell and so no current conduction mechanical joint will be produced between them causing the manufacture of a faulty product.

The primary objective of this invention was to create a technical solution resulting in a significant reduction of the amount of lead used so far in compact fluorescent lamps and in their electronic operating units.

Another objective of the present invention is to change the construction of compact fluorescent lamps, particularly the plastic housing as well as the screw base thereof, in a way that enables the end of the side lead wire to be welded to the base shell without appreciable hazard of producing shrinkage and with a reliable manufacturing process.

The objectives set are achieved by a plastic housing and screw base construction for compact fluorescent lamps and electrical operating units thereof comprising a base including a metal screw base shell with a thread-free opening portion and a plastic housing. The plastic housing has a neck part which is a body of rotation with central axis. The neck part comprises a cylindrical or slightly conical mantle portion, which starts from a stop shoulder, and a shell which connects to the mantle portion and which has an open end and diameters decreasing in at least one step, The base is pushed over and fixed to the neck part of the plastic housing. A lead wire is passed through from the inner space of the plastic housing between the thread-free opening portion of the base shell and the mantle portion of the neck part. A rib, which protrudes in and has a front surface perpendicular to radial direction, is formed on the mantle portion. A slot, which extends parallel to the central axis and has a depth suitable for accepting a portion of the lead wire leaving the plastic housing, is indented into the front surface. A local protrusion with an inner size and shape fitting to the rib is made in the thread-free opening portion of the base shell. The said portion of the lead wire is bent back towards the end of the base and is fixed to the base shell by resistance welding with a compression force exerted in radial direction from outside.

The construction according to the invention makes it possible to manufacture products containing significantly less lead than the known ones. In addition, the resistance welding, which can be used due to the invention, requires less material and energy than the soldered joints do. Making the plastic housing provided with the rib and the slot in this rib causes no significant extra cost and this construction allows conventional screw bases as well as conventional base fixing to be used. The orientation of and the distance between the welding electrode, the base shell and the lead wire is ensured during welding by the rib and slot formed on the neck part of the plastic housing. As an additional advantage, the torsional strength of the joint between the housing and the base is significantly increased as a result of the joint between the rib and the protrusion.

Figure 1:
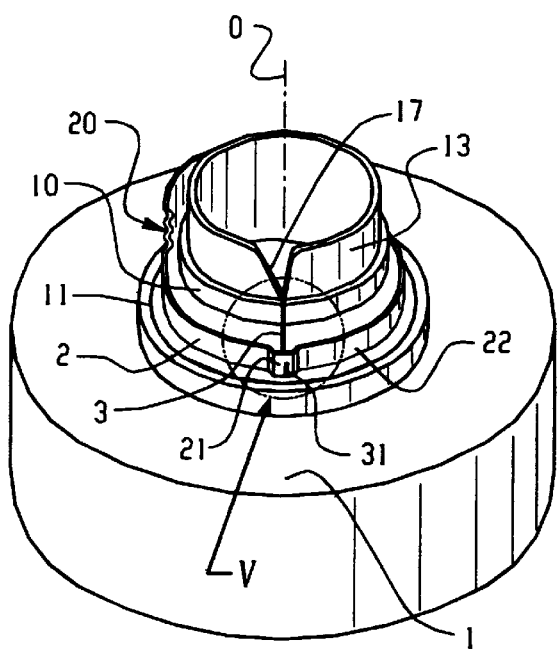
Figure 5:
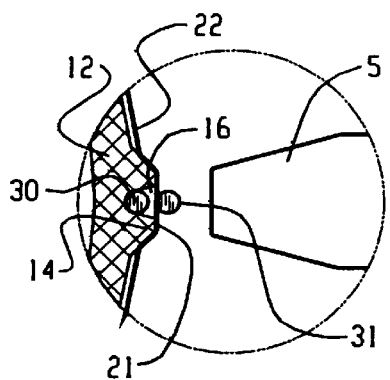

In the following, the essential features of the invention will be described in detail by an example for an embodiment illustrated by the figures of the attached drawing. In the drawing, FIG. 1 is an example, the present invention is embodied in, for the construction of the plastic housing and screw base in perspective view showing the base only partly and in partly sectional view, FIG. 2 an enlarged perspective view of detail 11 designated in FIG. 1, FIG. 3 is a side elevational sketch of the construction for plastic housing and base, also indicating the mechanical fixing of the base, FIG. 4 is the top view of FIG. 3 also showing the place of welding of the side connection lead together with the welding electrode and FIG. 5 is an enlarged view of detail V designated in FIG. 4.

Figure 4:
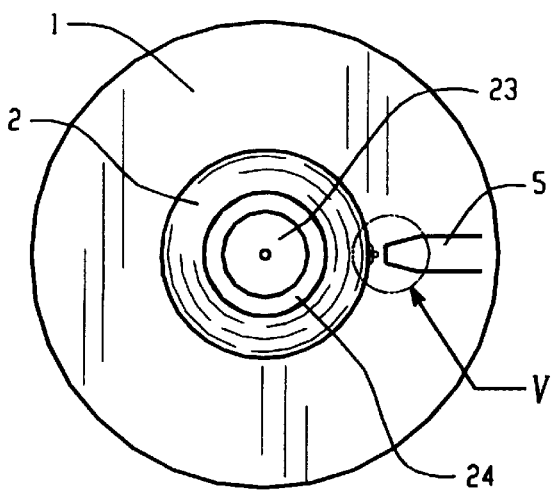
Figure 3:
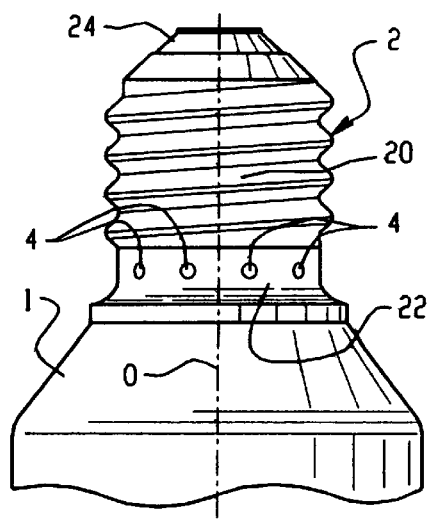

FIGS. 1 through 5 show various details of an example for the construction the present invention is embodied in. This construction can be used both for compact fluorescent lamps integral with the operating unit and for electronic operating units of compact fluorescent lamps made as separate construction units. A base 2, which meets the relevant standard specifications and includes a metal base shell 20 having a thread-free opening portion 22, is pushed over a neck part 10 of a plastic housing 1. The neck part 10 is a body of rotation consisting of a cylindrical or slightly conical mantle portion 12 starting from a stop shoulder 11 and a shell 13 connecting to the mantle portion 12 with open end and having a diameter decreasing in at least one step. FIG. 3 shows the screw shell 20 of the base 2, and also illustrates that the base 2 is fixed mechanically (in a way to be described in detail later) to the neck part 10 of the plastic housing 1 by local indentations 4 made in radial directions. The top view of FIG. 4 shows that the base 2, according to the standard construction known in itself, also includes an electrical central contact part 23 of metal material supported by a vitrite insert 24 of electrically insulating glass material. A lead wire (not shown) is connected to this central contact part 23 electrically by soldering or resistance welding. Another lead wire 3 is passed through between the mantle portion 12 starting from the stop shoulder 11 of the neck part 10 and the thread-free opening portion 22 of the base shell 20. The end 31 of said lead wire leaving the inner space of the plastic housing 1 is bent back towards the end of the screw base, and is fixed to the thread-free opening portion 22 of the base shell 20 in order to provide an electrical connection. The bent back end 31 of the lead wire 3 is fixed to the opening portion 22 of the base shell 20 by electric resistance welding combined with a compression force exerted from radial direction on the bent-back end 31 and the opening portion 22.

A rib 14 with a front surface 15 perpendicular to and protruding in radial direction is formed on the mantle portion 12 of the neck part 10. A slot 16 extending in the direction parallel to the central axis O is indented into the front surface 15 of the rib 14. This slot 16 accepts a portion 30 of the lead wire 3 leaving the plastic housing. The depth of the slot 16 is somewhat greater than the diameter of the portion 30 of the lead wire 3 so that the lead wire 3 is placed readily to the bottom of the slot 16. Owing to this, it is less possible that a welded joint comes into being between the inner side of the base shell 20 and the portion 30 of the lead wire 3 leaving the plastic housing 1 rather than between the bent back end 31 of the lead wire 3 and the base shell 20. A local protrusion 21 of an inner size and shape fitting to the rib 14 is formed on the opening portion 22 of the base shell 20. The base 2 is normally a pre-fabricated component part of the lamp so that this protrusion 21 of the base shell 20 is made by a machine unit or tool being coupled preferably with the machine line assembling the compact fluorescent lamp or its operating unit just before the operation of automated basing.

A slit 17 for guiding and positioning the lead wire 3 is formed in the shell 13 of the neck part 10, which slit 17 starts from the edge of the open end of the shell 13 and goes to the slot 16 of the rib 14 while narrowing towards the said slot 16. This slit 17 makes it easier to position and manipulate the lead wire 3 by a machine when the compact fluorescent lamp is manufactured.

In the case of the embodiment shown above, the base 2 with its opening portion 22 ahead is pushed over the mantle portion 12 of the neck part 10 of the plastic housing 1 until stopped by the shoulder 11 and then it is fixed mechanically by local indentations 4 protruding in radial direction from the thread-free region of the base shell into the surface of the mantle portion 12 of the neck part 10.

As an optional solution or combined with the mechanical fixing, the base 2 may also be fixed to the plastic housing 1 with a suitable adhesive material applied to the neck part 10 of the plastic housing 1, preferably between the base shell 20 and the shell 13 of the neck part 10. This results in an increased torsional strength between the plastic housing 1 and the base 2.

What is claimed is:

1. Plastic housing and screw base construction for compact fluorescent lamps and electrical operating units thereof comprising a base (2) including a metal screw base shell (20) having a thread-free opening portion (22); a plastic housing (1) having a neck part (10) being a body of rotation with central axis (O); said neck part comprising a cylindrical or slightly conical mantle portion (12) starting from a stop shoulder (11) and a shell (13) connecting to said mantle portion (12) and having an open end and diameters decreasing at least in one step; said base (2) being pushed over and fixed to said neck part (10) of said plastic housing (1); a lead wire (3) being passed through from the inner space of said plastic housing (1) between said thread-free opening portion (22) of said base shell (20) and said mantle portion (12) of said neck part (10); wherein a rib (14) protruding in and having a front surface (15) perpendicular to radial direction is formed on said mantle portion (12); a slot (16) extending parallel to said central axis (O) and having a depth suitable for accepting a portion (30) of said lead wire (3) leaving said plastic housing (1) is indented into said front surface (15); a local protrusion (21) having an inner size and shape fitting to said rib (14) is made in said thread-free opening portion (22) of said base shell (20); said portion (30) of said lead wire(3) is placed in said slot (16), the end of said lead wire (3) is bent back towards the end of said base (2) and is fixed to said base shell (20) by resistance welding with a compression force exerted radially from outside.

2. Plastic housing and screw base construction of claim 1 in which the depth of said slot (16) exceeds the diameter of said portion (30) of said lead wire(3) leaving said plastic housing (1).

3. Plastic housing and screw base construction of claim 1 in which a slit (17) for guiding and positioning said lead wire (3) is formed in said shell (13) of said neck part (10), said slit (17) starts from the edge of said open end of said shell (13), goes to said slot (16) of said rib (14) and narrows towards said slot (16).

4. Plastic housing and screw base construction of claim 1 in which said local protrusion (21) is formed on said thread-free opening portion (22) of said base shell (20) with a machine unit or tool being coupled with a machine line assembling said compact fluorescent lamp or said electrical operating unit just before the operation of automated basing.

5. Plastic housing and screw base construction of claim 1 in which said base (2) is fixed to said plastic housing (1) mechanically with radial local indentations (4) protruding into said mantle portion (12).

6. Plastic housing and screw base construction of claim 5 in which said base (2) is additionally fixed to said plastic housing (1) by applying an adhesive material between said base shell (20) and said shell (13) of said neck part (10).

* * * * *